United States Patent
Sze (10) Patent No.: US 8,261,410 B2
(45) Date of Patent: Sep. 11, 2012

(54) BLOW MOLDED HINGE MEMBERS AND A MOLD FOR FORMING THE HINGE MEMBERS

(75) Inventor: Wai Po Sze, Hong Kong (CN)

(73) Assignee: Red Plastics Industry (Hong Kong) Co., Ltd., Kowloon, Hong Kong (CN)

( * ) Notice: Subject to any disclaimer, the term of this patent is extended or adjusted under 35 U.S.C. 154(b) by 201 days.

(21) Appl. No.: 12/693,362

(22) Filed: Jan. 25, 2010

(65) Prior Publication Data
US 2011/0094059 A1      Apr. 28, 2011

(30) Foreign Application Priority Data

Oct. 27, 2009   (CN) .................... 2009 2 0268152 U (51) Int. Cl.
*E05D 7/10*          (2006.01)
(52) U.S. Cl. ................ 16/266; 16/262; 16/386; 16/387; 16/385; 425/522
(58) Field of Classification Search .................... 16/266, 16/267, 268, 269, 225, 386, 387, 254, 262; 220/826, 840, 841, 842, 743, 844, 908, 4.22, 220/4.23; 264/238, 242, 271.1, 273–279, 264/328.1, 523; 425/438, 400, 401, 442, 425/522
See application file for complete search history.

(56) References Cited

U.S. PATENT DOCUMENTS

| 2,677,479 | A | * | 5/1954 | Yoneo Kiba .................. 220/840 |
| 2,762,076 | A | * | 9/1956 | Kiba ............................. 220/844 |
| 3,126,120 | A | * | 3/1964 | Crate ............................. 220/844 |
| 3,295,714 | A | * | 1/1967 | Di Addario .................... 220/840 |
| 5,070,577 | A | * | 12/1991 | Bonneville et al. ............ 16/260 |
| 5,311,643 | A | * | 5/1994 | Marquardt et al. ............ 16/267 |
| 5,657,893 | A | * | 8/1997 | Hitchings ...................... 220/326 |
| 6,000,550 | A | * | 12/1999 | Simpson et al. ............... 206/711 |
| 6,315,154 | B1 | * | 11/2001 | Newby, Sr. ..................... 220/844 |
| 6,461,026 | B1 | * | 10/2002 | Wang ............................. 362/374 |
| 6,701,573 | B1 | * | 3/2004 | Ciavarella et al. ............. 16/266 |
| 6,918,508 | B2 | * | 7/2005 | Hwang .......................... 220/826 |
| 2003/0067101 | A1 | * | 4/2003 | Liu ................................. 264/531 |

* cited by examiner

*Primary Examiner* — Chuck Y. Mah
(74) *Attorney, Agent, or Firm* — Global IP Services; Tianhua Gu (57) ABSTRACT

A hinge member for a blow-molded article includes at least two hinge arms with axial holes defined therein and a hinge pin extended therethrough. The hinges arms include upper and lower ones provided on the two parts of the article respectively. At least two openings are defined in the wall of each hinge arm and parallel to a horizontal plane at which the axis of the axial hole is located. At least one opening is positioned at each side of the horizontal plane. The length and width of the openings are arranged such that each opening corresponds to a particular section of the axial hole. The axial hole can be formed by providing corresponding bulges in the mold without removing a core pin, thereby simplifying molding process and increasing yield rate. The present disclosure also provides a blow-molded article having the hinge member and a mold for forming the article.

8 Claims, 13 Drawing Sheets

BLOW MOLDED HINGE MEMBERS AND A MOLD FOR FORMING THE HINGE MEMBERS

This application claims priority to Chinese Patent Application No. 200920268152.4, filed on Oct. 27, 2009, which is hereby incorporated by reference.

BACKGROUND

1. Technical Field

The present disclosure relates generally to a blow-molded article and, more particularly to a hinge group in the blow-molded article, and a method and a mold for forming the hinge group.

2. Description of Related Art

Blow molding is primarily used for producing hollow articles, and is carried out by inflating high-temperature plastic parison within a molding chamber. A number of blow-molded articles have a hinge group. An existing hinge group generally has several hinge arms being set up on two parts of a blow-molded article and stretching out towards hinge arms on opposite parts, which are normally classified as an upper hinge arm and a lower hinge arm. The hinge arms have shaft holes respectively and various portions of the hinge arms are alternately set up. When the two parts are joined together, corresponding hinge arms are connected with their shaft holes being on the same axis to form a common through hole. By allowing hinge pin to pass through this shaft hole, the two parts of the blow-molded article are joined together.

Generally, molding a shaft hole in a hinge arm using blow molding requires a very complex mold. In a molding process disclosed in U.S. Pat. No. 5,288,453A, a core rod is placed between male and female molds, with the core rod being matched with a shaft hole of a hinge arm to be molded. A parison is placed between the two molds which are then combined together with any excessive part of the parison being cut off. The parison is then inflated by blowing air thereunto, pressurized, and cooled down. The two molds are unloaded and the core rod is removed. As illustrated, a procedure of removing a core rod exists in the conventional blow molding when a shaft hole of a hinge arm is molded, thus making the procedure a relatively complicated one. Further, the wall of the shaft hole that has been shaped is prone to damages when the core rod is removed, thus leading to a low product acceptability rate.

SUMMARY

In view of the deficiencies of a low yield rate and a relatively complicated molding process in a blow-molded article that has a hinge group in existing technologies, a technical problem to be solved in the present disclosure is to provide a hinge group of a blow-molded article to avoid a procedure of removing a core rod during a molding process in order to improve the production yield.

The technical scheme adopted in the present disclosure for solving the above technical problem is: building a hinge group of a blow-molded article, which includes at least two hinge arms that are set up on the blow-molded article. The hinge arms have respective shaft holes. The hinge arms include an upper hinge arm and a lower hinge arm which are separately set up on two portions of the blow-molded article in respective positions. The hinge group further includes a core pin which goes through the upper hinge arm and the lower hinge arm. At least two openings are defined in the wall of the shaft hole of each of the at least two hinge arms. The openings are set up in parallel to a horizontal plane, and at least one opening is set up on each side of the horizontal plane. The openings on the wall of the hole satisfy the following relationship:

$$\sum_{i=1}^{n} L_i \geq L_z \text{ and } d \leq Bi < D (i = 1, 2, \ldots, n;$$

$n$ represents a natural number that is greater than 1);

where:

n stands for the number of openings that are defined in the wall of each of the at least two hinge arms;

Li stands for the length of i-th opening along the axis of the shaft hole;

Lz stands for the length of the wall of each of the at least two hinge bosses along the axis of the shaft hole;

Bi stands for the projection width of i-th opening projected on a horizontal plane perpendicular to the axis of the shaft hole;

d stands for the inner diameter of the shaft hole; and

D stands for the outer diameter of the hinge arm.

In the disclosed hinge group of the blow-molded article, the openings are rectangular or ellipsoidal in shape.

The disclosed hinge group of the blow molded article includes six hinge arms comprising three upper hinge arms and three lower hinge arms which are interleaved with each other in a way such that all shaft holes of the hinge arms are on the same axis and aligned to form a shaft hole. The hinge pin passes through the shaft hole to join the upper and lower hinge arms together.

In view of the deficiencies of a low yield rate and a relatively complicated molding process in blow-molded articles having a hinge group in existing technologies, another technical problem to be solved in the present disclosure is to provide a hinge group as the above hinge group to simplify a manufacturing procedure and improve the production yield.

The technical scheme adopted in the present disclosure for solving the above technical problem is: build a hinge group of a blow-molded article, which includes a first hinge part, a second hinge part and at least one hinge group that connects the first hinge part and the second part together. The hinge group includes at least two hinge arms that are set up on the blow-molded article. The hinge arms have respective shaft holes. The hinge arms include an upper hinge arm and a lower hinge arm which are separately set up on the first and the second portions of the blow-molded article in respective positions. The hinge group further includes a core pin which goes through the upper hinge arm and the lower hinge arm. At least two openings are opened in the wall of the shaft hole of each of the at least two hinge arms. The openings are set up in parallel to a horizontal plane, and at least one opening is set up on each side of the horizontal plane. The openings on the wall of the hole satisfy the following relationship:

$$\sum_{i=1}^{n} L_i \geq L_z \text{ and } d \leq Bi < D (i = 1, 2, \ldots, n;$$

$n$ represents a natural number that is greater than 1);

where:

n stands for the number of openings that are opened in the wall of each of the at least two hinge arms;

Li stands for the length of i-th opening along the axis of the shaft hole;

Lz stands for the length of the wall of each of the at least two hinge bosses along the axis of the shaft hole;

Bi stands for the projection width of i-th opening which is projected on a horizontal plane and is perpendicular to the axis of the shaft hole;

d stands for the inner diameter of the shaft hole; and

D stands for the outer diameter of the hinge arm.

In view of the above blow-molded article disclosed in this disclosure, still another technical problem to be solved in the present disclosure is to provide a specialized mold for this blow-molded article.

The technical scheme adopted in the present disclosure for solving this technical problem is: construct a specialized mold for producing the above blow-molded article by blow molding. The specialized mold includes an upper mold and a lower mold. The upper mold includes a first upper molding chamber and a second upper molding chamber, which separately match with outer contours of a first hinge portion and a second hinge portion of the blow-molded article. The lower mold includes a first lower molding chamber and a second lower molding chamber, which separately match with inner contours of the first hinge portion and the second hinge portion of the blow-molded article. A first upper groove which matches with an upper hinge arm is set up in the first upper molding chamber of the upper mold in a position corresponding to that upper hinge arm. A first upper bulge is set up in the first upper groove to match with an upper opening of the upper hinge arm and extends into a shaft hole of the upper hinge arm up to a wall opposite to the upper opening. A first lower groove which matches with the upper hinge arm is set up in the first lower molding chamber of the lower mold in a position corresponding to the upper hinge arm. A first lower bulge is set up in the first lower groove to match with a lower opening of the upper hinge arm and extends into the shaft hole of the upper hinge arm up to a wall opposite to the lower opening. A second upper groove which matches with a lower hinge arm is set up in the second upper molding chamber of the upper mold in a position corresponding to that lower hinge arm. A second upper bulge is set up in the second upper groove to match with an upper opening of the lower hinge arm and extends into a shaft hole of the lower hinge arm up to a wall opposite to that upper opening. A second lower groove which matches with the lower hinge arm is set up in the second lower molding chamber of the lower mold in a position corresponding to the lower hinge arm. A second lower bulge is set up in the second lower groove to match with a lower opening of the lower hinge arm and extends into the shaft hole of the lower hinge arm up to a wall opposite to that lower opening.

In the disclosed specialized mold for the blow-molded article, the first upper bulge of the first upper molding chamber and the second upper bulge of the second upper molding chamber are set up in the middle of the entire upper mold, while the first lower bulge of the first lower molding chamber and the second lower bulge of the second lower molding chamber are set up in the middle of the entire lower mold.

In the disclosed specialized mold for the blow-molded article, an upper mold rod that is changeable may be set up in the upper mold. The first and second upper bulges are set up on this upper mold rod. A lower mold rod that is changeable may be set up in the lower mold. The first and second lower bulges are set up in the lower mold rod.

The following beneficial effects can be obtained by utilizing the hinge group of the blow-molded article described in this disclosure. At least two openings are opened in the wall of each hinge arm and are placed on two sides of a horizontal plane such that no opening is above or below the horizontal plane. Since the openings are set up in parallel to the horizontal plane and the horizontal plane is a plane that is horizontal and passes through the center axis of the shaft hole, the horizontal plane is perpendicular to the direction of unloading of the molds during processing by blow molding. Specifically, the horizontal plane is parallel to parting surfaces of the molds. Thus, the openings can be formed simply by providing corresponding bulges on corresponding molds. By setting the projection width Bi of each opening that is projected on the parting surface of the mold and is perpendicular to the axial direction of the shaft hole to be larger than or equal to the inner diameter d of the shaft hole but less than the outer diameter D of the wall of each hinge arm, that is, the projection width Bi of each opening on the parting surface of the mold is larger than or equal to the inner diameter d of the shaft hole, a bulge on the mold not only can form a opening on the wall of the shaft hole, but also extends inside the shaft hole to form a section of the shaft hole that is corresponding to that opening, thereby facilitating unloading the bulge and keeping the wall of the shaft hole, and allowing the wall sections of the shaft hole that are corresponding to each opening to be continuous. By setting the sum of the lengths of all openings, $$\sum_{i=1}^{n} L_i,$$

along the axial direction of the shaft hole to be larger than or equal to the length Lz of the wall along the axial direction of the shaft hole, each section of the shaft hole has a corresponding opening so that each section of the shaft hole can be formed at the same time when each opening is formed. Because the sections of the shaft hole are connected with each other, an ellipsoidal core rod for forming the shaft hole is not required to be set up in the mold, thus avoiding the process of unloading the core rod, preventing the formed wall of the shaft hole from damage when the core rod is unloaded, and facilitating the manufacture of this type of hinge group. Furthermore, manufacture of an article having this type of hinge group is facilitated, thus improving the production yield.

The following beneficial effects can be obtained by utilizing the specialized mold of the blow-molded article described in this disclosure. The specialized mold has two molding chambers. Specifically, the mold can form the first hinge portion and the second hinge portion at one time. By setting up bulges in the upper and the lower mold chambers in positions corresponding to the hinge arms, openings can be formed on the wall of the shaft hole of the hinge arms. By allowing the bulges to extend into the shaft hole up to walls opposite to respective openings, the bulges can form respective sections of shaft hole that are corresponding to the openings at the same time. Because the openings on the hinge arms of the blow-molded article that is formed by this specialized mold satisfy the following relationship:

$$\sum_{i=1}^{n} L_i \geq L_z \text{ and } d \leq Bi < D (i = 1, 2, \ldots, n;$$

$n$ represents a natural number that is greater than 1), the entire shaft hole can be formed through the bulges corresponding to the openings on the hinge arms, thus avoiding the process of unloading the core rod, simplifying the manufacture process, and improving the production yield.

Furthermore, by placing the bulges in the two molds that are corresponding to the hinge arms in the middle of the entire mold, the bulges in the two molds can act as positioning references for each other during manufacture of the mold, thus improving positioning accuracy of the bulges. Moreover, all the bulges are preferred to be placed in a separate mold rod which is set up and fixed in the middle of the mold. Since the mold rod is changeable, different mold rods may be used according to needs to form different hinge groups having different numbers of hinge arms, in order to satisfy different hinge requirements of articles.

The present disclosure is described in further detail below using accompanying figures and exemplary embodiments.

DETAILED DESCRIPTION

Many blow-molded articles having a hinge group generally include two parts, such as a first part and a second part for making the hinge group as a whole. At least a hinge member is provided along edges of the two parts to combine the first part and the second part to form the hinge group. Various embodiments disclosed in the present invention are illustrated based on mold chamber in blow-molded technology. A mold chamber is taken as an example, but not limited to, for illustrating hinged blow molded articles of the present disclosure.

The blow molded article of present disclosure includes at least two hinge arms and a hinge pin. The hinge arms are provided in corresponding positions in the two parts of the article. For ease of description, the hinge arm provided in the first part is referred to as an upper hinge arm, and the hinge arm provided in the second part is referred to as a lower hinge arm.

Figure 1:
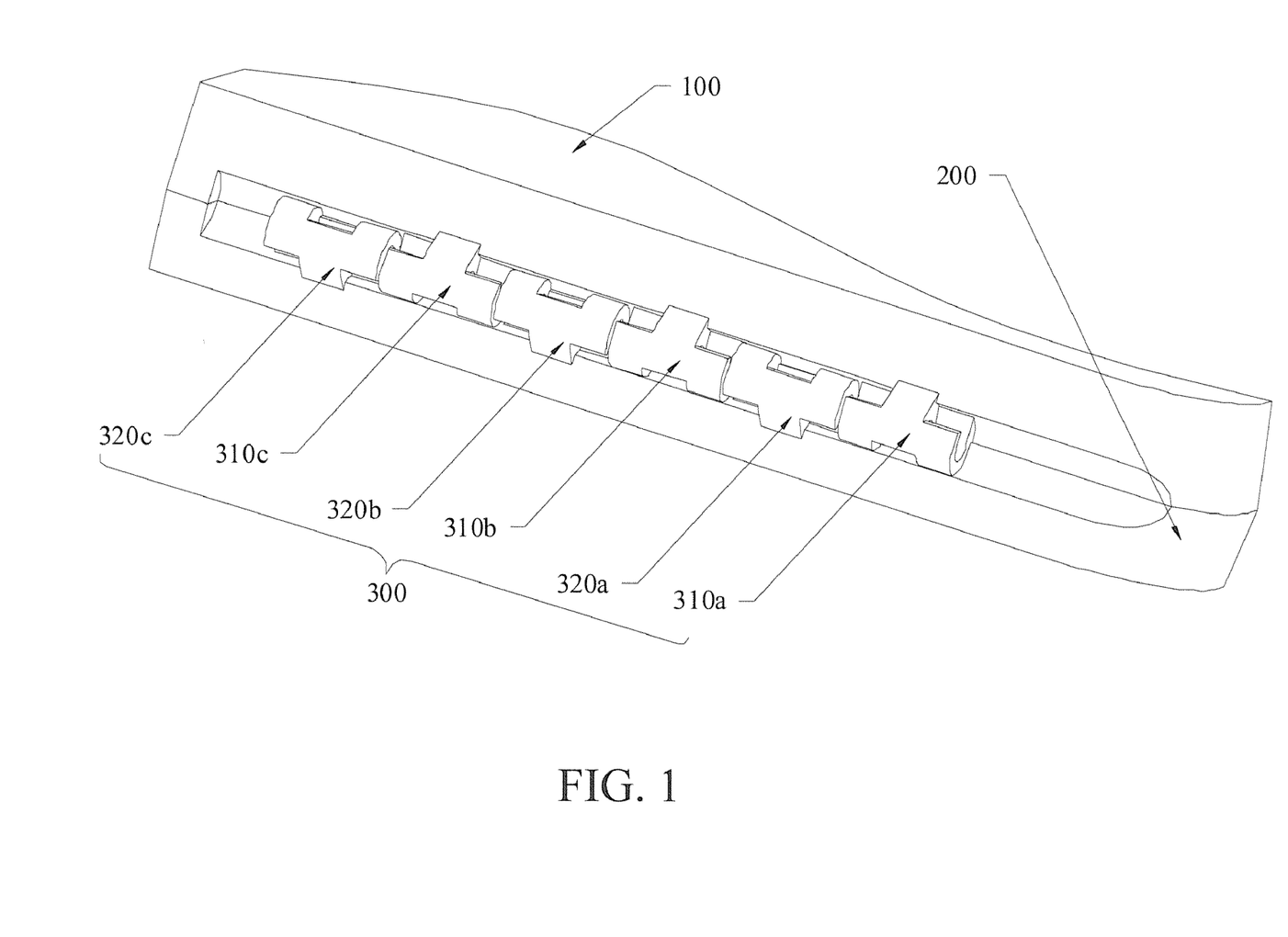
FIG. 1 is a block diagram of a hinge group of a blow-molded article in accordance with the present disclosure.
Figure 2:
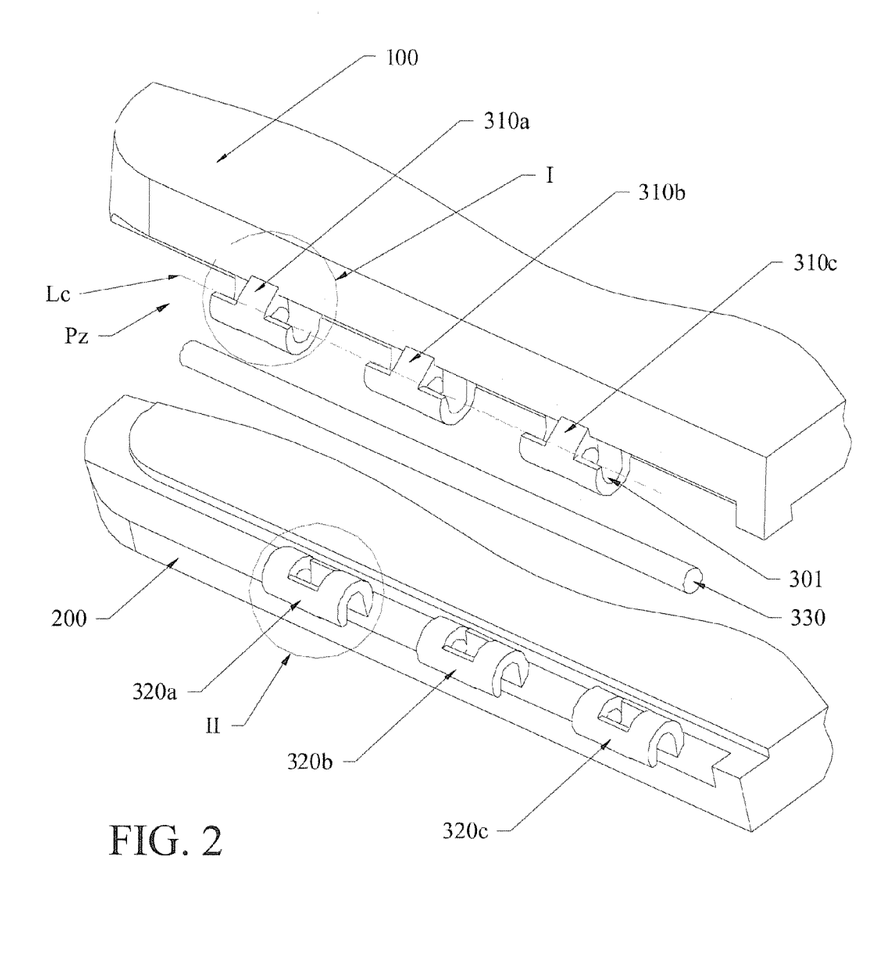
FIG. 2 is an exploded view of a hinge group of a blow-molded article in accordance with the present disclosure.
Figure 2A:
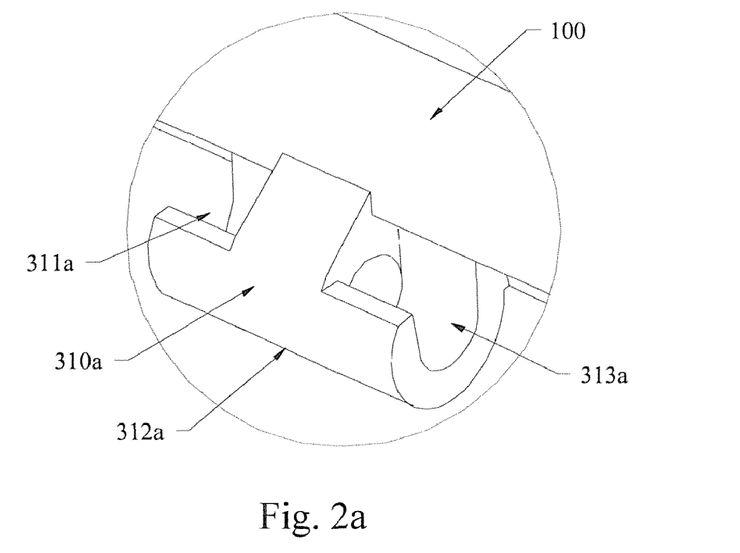
FIG. 2*a* is an enlarged view of Part I disclosed in FIG. 2.

FIGS. 1-2 illustrate a blow molded chamber in accordance with a preferred embodiment of the present disclosure. The blow molded chamber comprises an upper shell 100 and a lower shell 200, i.e., the first part and the second part. The upper and lower shells 100, 200 are hinged together by a hinge member 300. The number of the hinge member 300 can be varied into two or more in alternative embodiments, if necessary.

Figure 3:
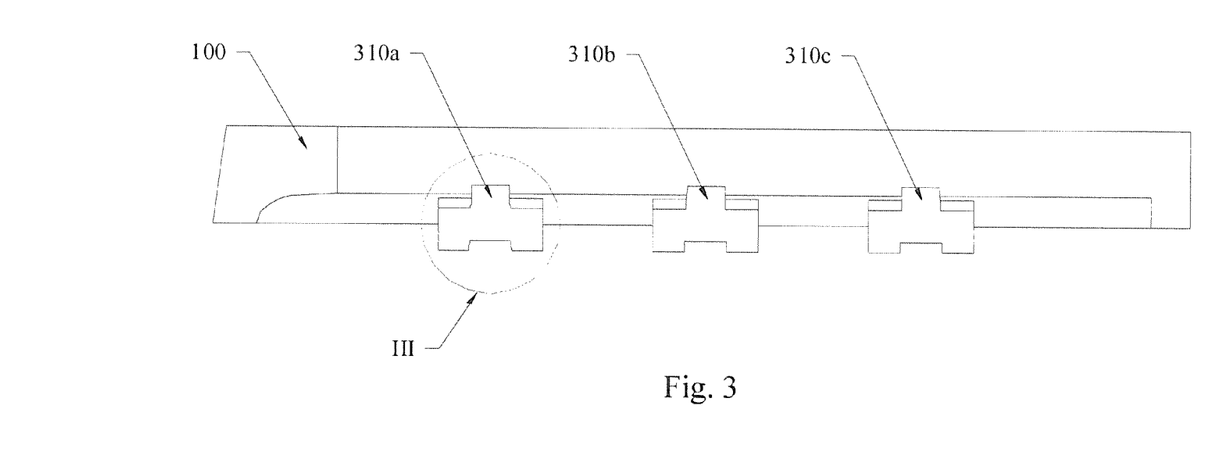
FIG. 3 is a front view of an upper hinge of a hinge group of a blow-molded article in accordance with the present disclosure.
Figure 3A:
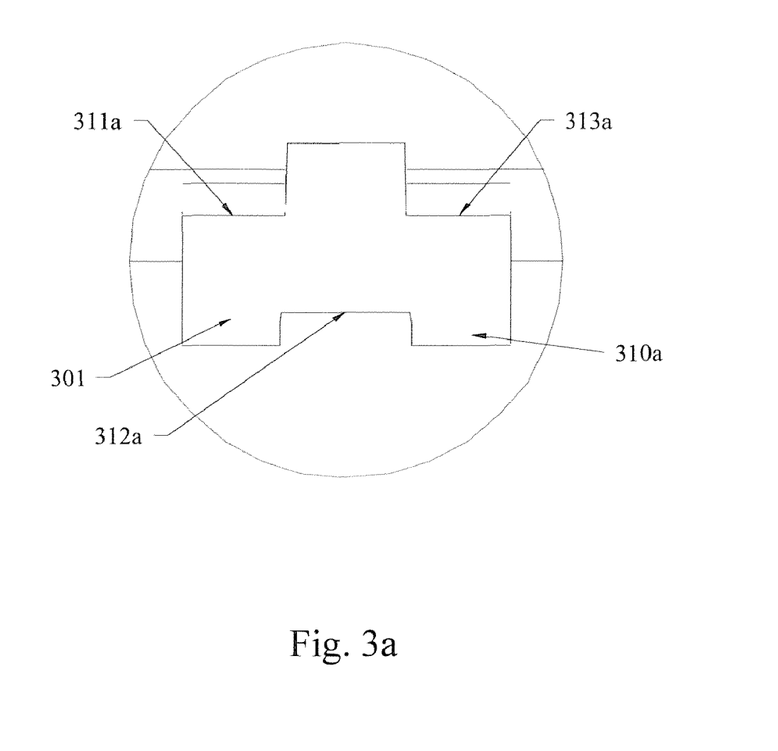
FIG. 3*a* is an enlarged view of Part III disclosed in FIG. 3.
Figure 4:
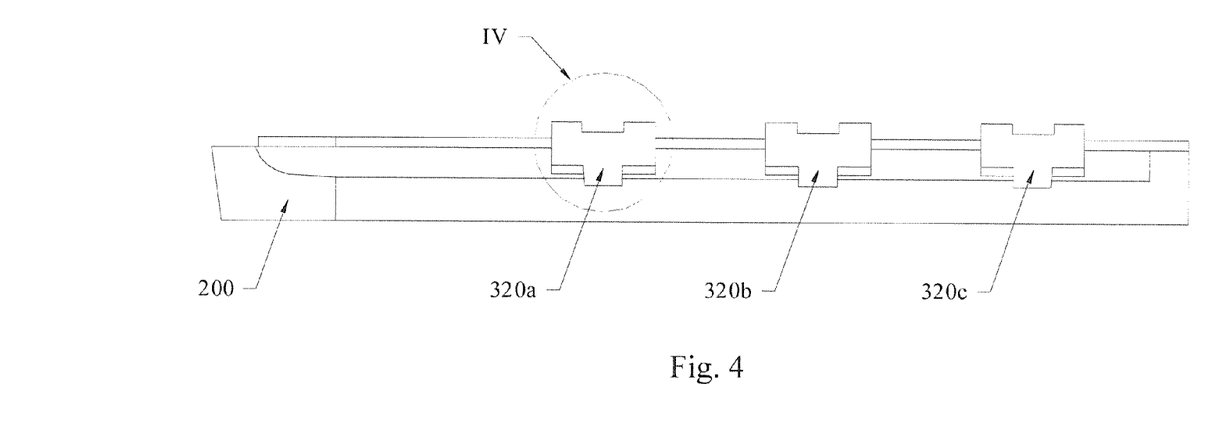
FIG. 4 is a front view of a lower hinge of a hinge group of a blow-molded article in accordance with the present disclosure.
Figure 5:
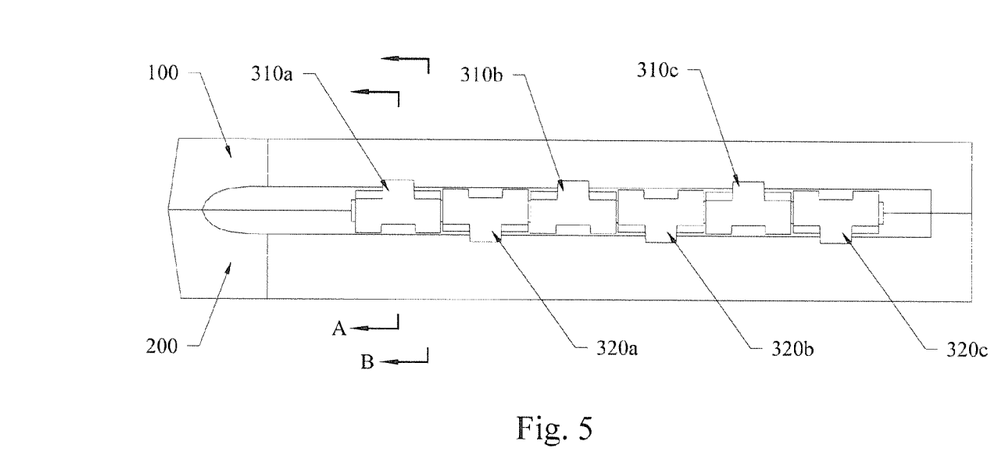
FIG. 5 is a schematic diagram of an assembly of a hinge group of a blow-molded article in accordance with the present disclosure.
Figure 6:
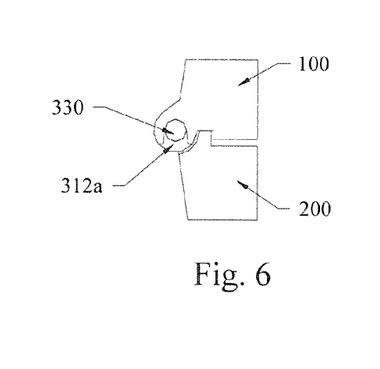
FIG. 6 is a cross-sectional view of FIG. 5 taken along line A-A thereof.
Figure 7:
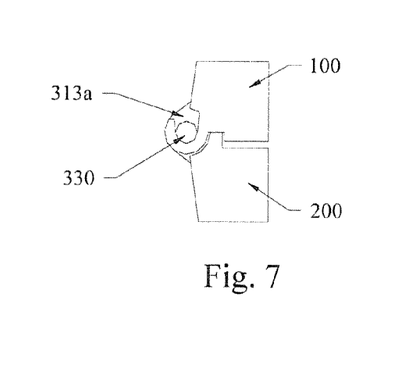
FIG. 7 is a cross-sectional view of FIG. 5 taken along line B-B thereof.
Figure 8:
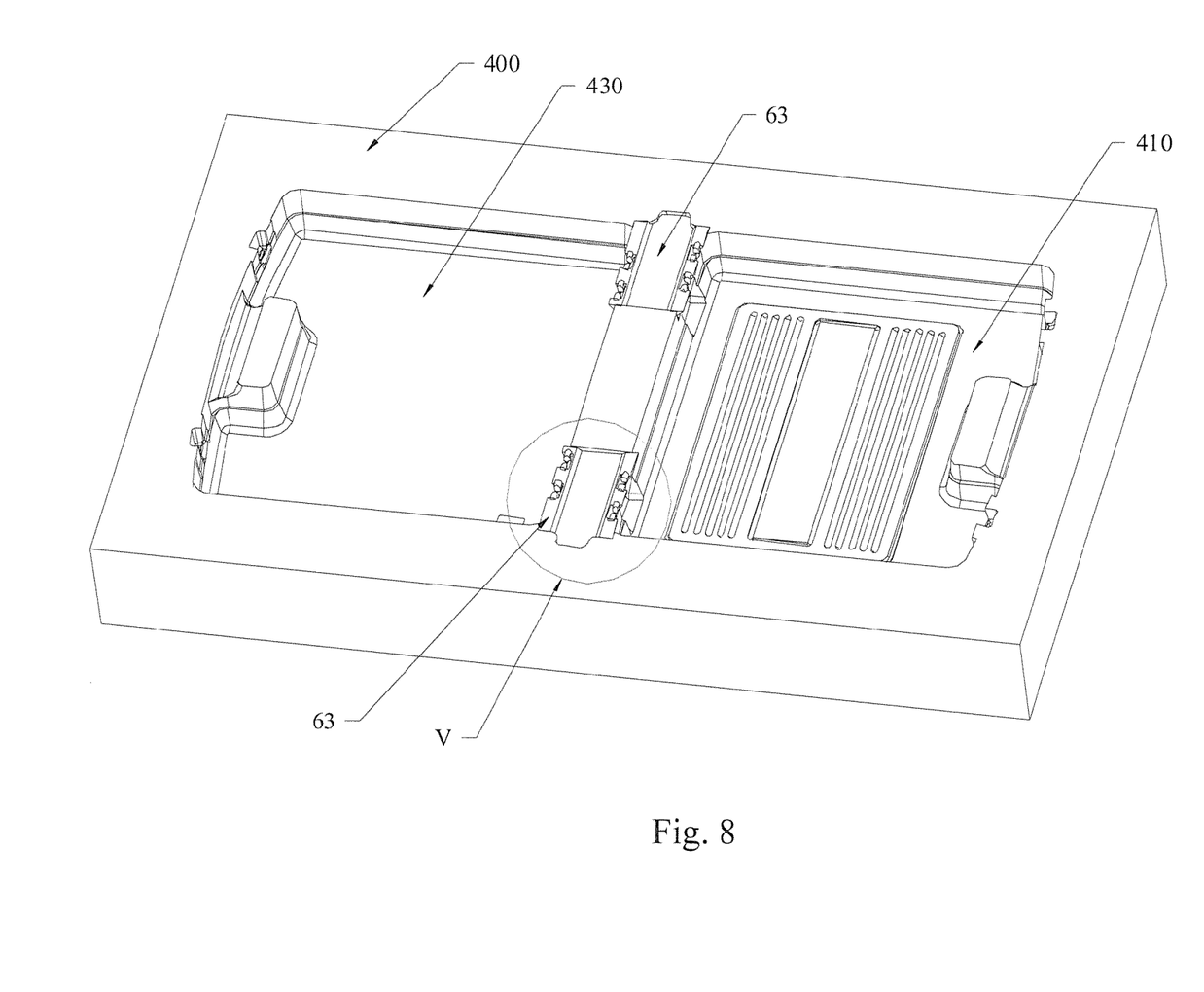
FIG. 8 is a schematic structural diagram of an upper mold of a specialized mold for a blow-molded article in accordance with the present disclosure.
Figure 9:
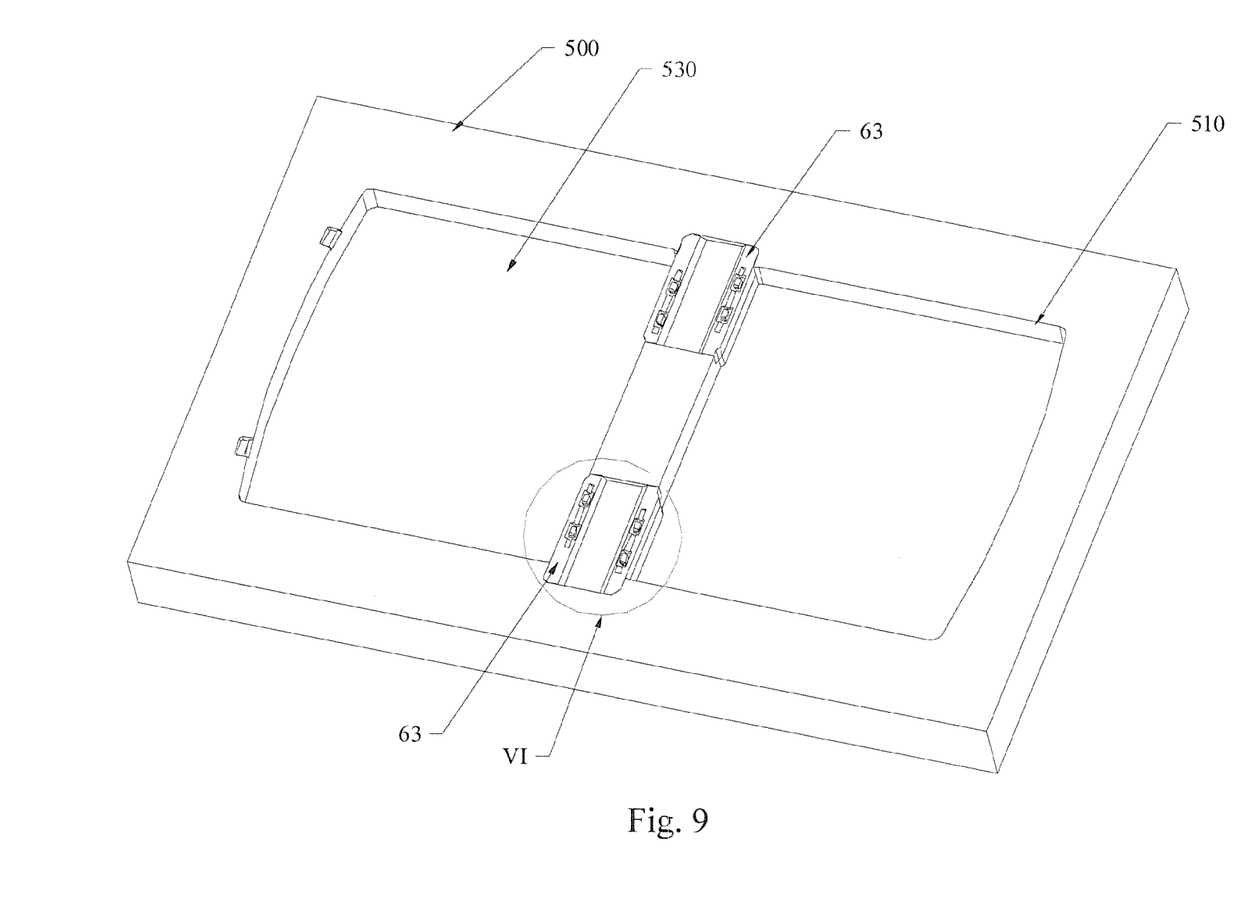
FIG. 9 is a schematic structural diagram of a lower mold of a specialized mold for a blow-molded article in accordance with the present disclosure.

Referring to FIGS. 2-4, the hinge member 300 comprises at least two hinge arms and a hinge pin, and preferably six hinge arms in the present embodiment. The hinge arms are divided into three upper hinge arms and three lower hinge arms. The upper hinge arms, namely the first upper hinge arm 310*a*, the second upper hinge arm 310*b* and the third upper hinge arm 310*c*, are provided on the upper shell 100 (i.e., the first part). The lower hinge arms, namely the first lower hinge arm 320*a*, the second lower hinge arm 320*b* and the third lower hinge arm 320*c*, are provided on the lower shell 200 (i.e., the second part). The upper and lower hinge arms are provided on the corresponding positions of the upper and lower shells 100, 200 such that one upper hinge arm is positioned between two adjacent lower hinge arms when the upper and lower shells 100, 200 are closed together. As shown in FIGS. 1 and 5, the first lower hinge arm 320*a* is positioned between the first and second upper hinge arms 310*a*, 310*b*; the second lower hinge arm 320*b* is positioned between the second and third upper hinge arms 310*b*, 310*c*; the third upper hinge arm 310*c* is positioned between the second and third lower hinge arms 320*b*, 320*c*. Each arm of all upper arms and all lower arms in the hinge group forms a shaft hole 301. In the hinge member 300, shaft holes 301 of all the hinge arms are aligned to define a pin hole for the hinge pin 330. The hinge pin 330 extends through the shaft holes 301 of the first upper hinge arm 310*a*, the first lower hinge arm 320*a*, the second upper hinge arm 310*b*, the second lower hinge arm 320*b*, the third upper hinge arm 310*c* and the third lower hinge arm 320*c* in sequence to hinge the upper hinge arms 310*a*, 310*b*, 310*c* with the lower hinge arms 320*a*, 320*b*, 320*c* (i.e., the upper and lower shells 100, 200) together.

At least two openings are defined in the wall of each hinge arm. The openings are parallel to horizontal axis on the horizontal plane of the shaft hole to facilitate unloading a core rod after molding operation. As shown in FIG. 2, the horizontal axis plane Pz of the shaft hole is a horizontal axis plane Lc of the pin hole. The plane Pz is perpendicular to the direction of unloading the core rod after the molding operation, that is, the plane Pz is parallel to the surface of core rod.

Referring to FIGS. 2, 2*a*, 3, 3*a*, in the present embodiment, the first upper hinge arm 310*a* is taken as an example for detail description of the structure of the hinge arms. Three openings are defined in the wall of the first upper hinge arm 310*a*. More openings can be further defined if necessary. The openings are preferably rectangular, and can also be in elliptical shape or other shapes. As shown in FIGS. 2*a*, 3*a*, 6, 7, the openings in the wall of the first upper hinge arm 310*a* can be classified as upper opening as the opening is located above the plane Pz and as lower opening as the opening is located below the plane Pz. Particularly, opening 311a and opening 313a are upper openings and opening 312a is a lower opening.

Figure 2B:
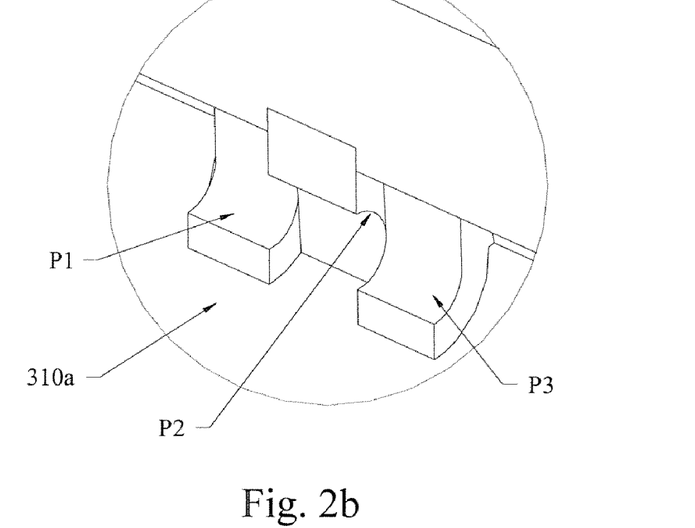
FIG. 2*b* is a cross-sectional view of FIG. 2*a*.
Figure 3B:
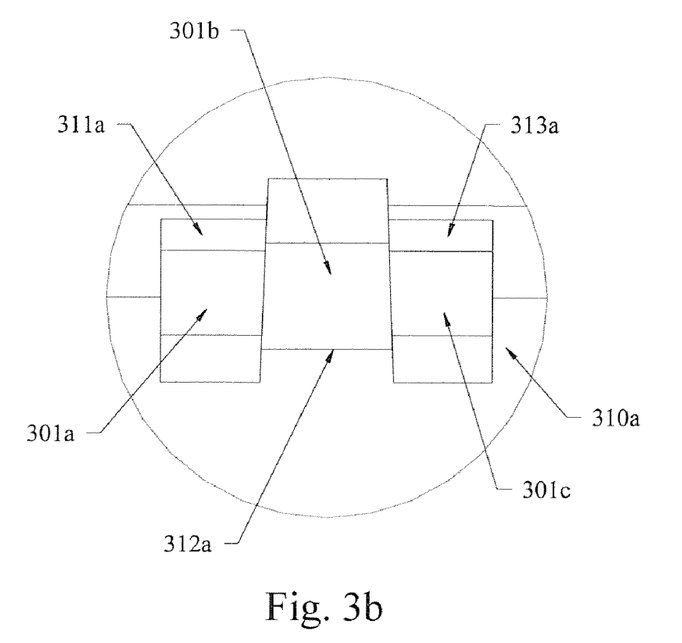
FIG. 3*b* is a cross-sectional view of FIG. 3*a*.

The openings 311a, 312a, 313a satisfy the following relationship:

$$\sum_{i=1}^{n} L_i \geq L_z \text{ and } d \leq Bi < D (i = 1, 2, \ldots, n;$$

n represents a natural number that is greater than 1)

where, n stands for the number of openings defined in the wall of the first upper hinge arm 310a; Li stands for a length of the i-th (i.e., the Nth, N is equal to i, same as below) opening along the shaft hole 301; Lz stands for a length of the wall of the first upper hinge arm 310a along the axis if the shaft hole 301; Bi stands for a projecting width of the i-th opening projected on a horizontal plane (i.e., the horizontal plane Pz) perpendicular to the axis (i.e., the axis Lc) of the shaft hole 301; d stands for an inner diameter of the shaft hole 301; and D stands for an outer diameter of the wall of the first upper hinge arm 310a. That is to say, the sum $$\sum_{i=1}^{n} L_i$$

of the length of all the openings 311a, 312a, 313a along the axis Lc is greater than or equal to the length of the wall of the first upper hinge arm 310a along the axis Lc of the axial hole 301. In the present embodiment, L1+L2+L3=Lz. The projection width Bi of each opening on the horizontal plane is greater than or equal to the inner diameter d of the shaft hole 301 and less than the outer diameter D of the wall of the first upper hinge arm 310a. That is, d≦B1<D and d≦B2<D and d≦B3<D. In the present embodiment, the projection widths Bi of the openings projected on the horizontal plane are all equal to the inner diameter d of the shaft hole 301 such that at least semi-cylindrical walls P1, P3, P3 are configured to form a continuous wall to engage with the hinge pin 330, as shown in FIGS. 2b, 3b.

The second and third upper hinge arms 310b, 310c and the first, second, third lower hinge arms 320a, 320b, 320c have the similar structure with the first upper hinge arm 310a and cooperate with the first upper hinge arm 310a to form the hinge member 300. The hinge pin 330 extends through the axial holes 301 of all the hinge arms to hinge with the upper and lower shells 100, 200. The number of the openings in the wall of each hinge arm can be varied as needed (e.g., determined by the length of the shaft hole of the hinge arm).

The present disclosure also provides a specialized mold for blow molding plastic articles having the hinge member disclosed above. The specialized mode is provided for forming a blow molded article having two hinge members described above as an example. Each hinge member 300 comprises two upper hinge arms and two lower hinge arms having the same structure with the hinge arm described above, namely each hinge arm defining two upper openings and one lower opening, similar to the previously described first upper hinge arm 310a defining two upper openings 311a, 313a and one lower opening 312a therein. Referring to FIGS. 8-11, preferably, the specialized mold has two mold chambers for forming the first and second hinge parts 100, 200 of the article at one time. Specifically, the specialized mold comprises an upper mold 400 defining a first upper chamber 410 and a second upper chamber 430 therein, and a lower mold 500 defining a first lower chamber 510 and a second lower chamber 530 therein. The contours of the first and second upper chambers 410, 430 respectively conform to the outer contours of the first and second hinge parts 100, 200 of the article. The contours of the first and second lower chambers 510, 530 respectively conform to the inner contours of the first and second hinge parts 100, 200 of the article. The parison is deformed to assume the shape of the first upper and lower chambers 410, 510 to form the first hinge part 100 of the article, and the shape of the second upper and lower chambers 430,530 to form the second hinge part 200 of the article, after the molding operation.

Figure 10:
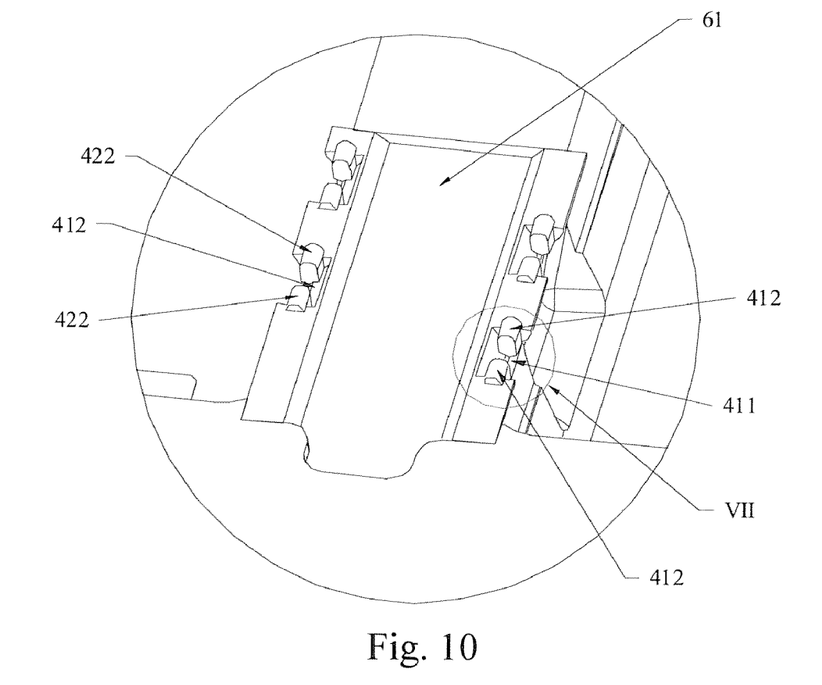
FIG. 10 is an enlarged view of Part V disclosed in FIG. 8.
Figure 10A:
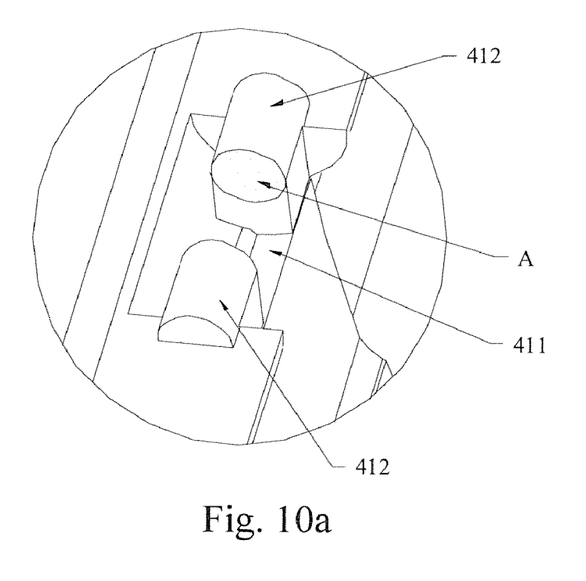
FIG. 10*a* is an enlarged view of Part VII disclosed in FIG. 10.
Figure 11:
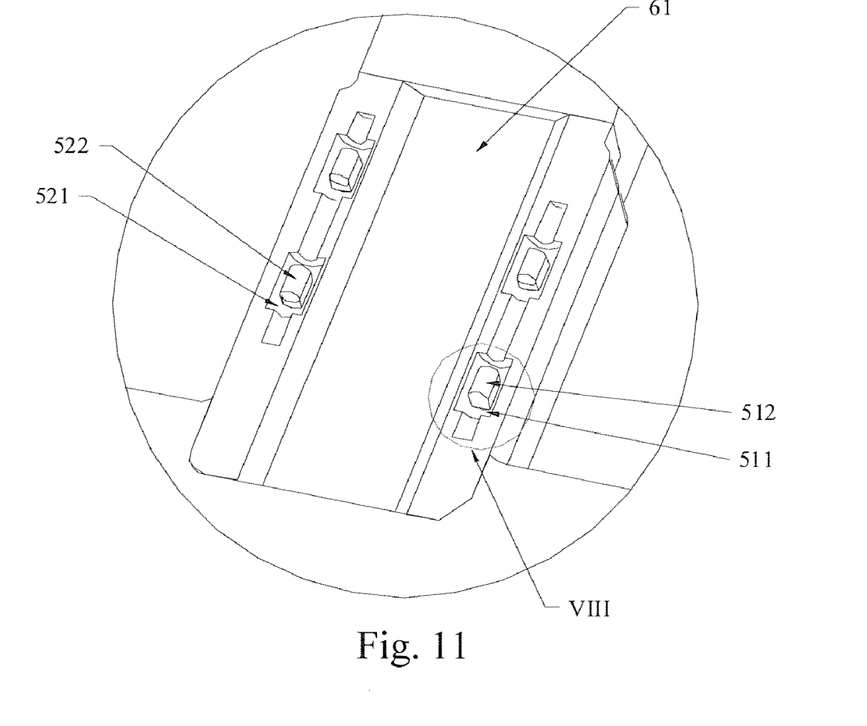
FIG. 11 is an enlarged view of Part VI disclosed in FIG. 9.
Figure 11A:
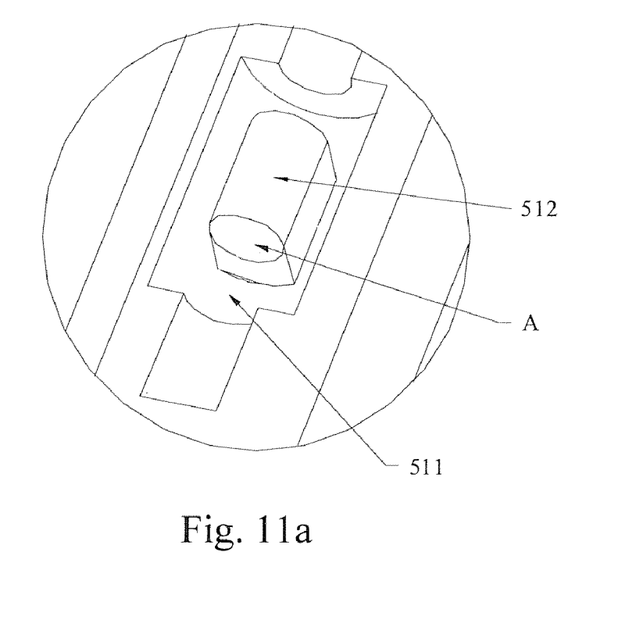
FIG. 11*a* is an enlarged view of Part VIII disclosed in FIG. 11.

Since there are a plurality of hinge arms in the hinge member of the article, the part corresponding to the first upper hinge arm 310a in the first hinge part 100 of the specialized mold is taken as an example for further describing the structure of the specialized mold for forming the first upper hinge arm 310a. As shown in FIGS. 2a, 2b, 3a, 3b, the first upper hinge arm 310a defines two upper openings 311a, 313a and a lower opening 312a. Referring to FIGS. 10-11, a first upper recess 411 is defined in the first upper chamber 410 and located at the middle of the upper mold 400. A first lower groove 511 is defined in the first lower chamber 510 and located at the middle of the lower mold 500. The first upper and lower grooves 411, 511 cooperate to define a chamber for forming the first upper hinge arm 310a. Two first upper bulges 412 are formed in the first upper groove 411 to match with the upper openings 311a, 313a of the first upper hinge arm 310a. The first upper bulges 412 extend into the axis hole 301 of the first upper hinge arm 310a and terminate at the inner wall P1 and P3 facing toward the upper openings 311a, 313a (seen in FIG. 2b), for forming the upper openings 311a, 313a and the shaft hole sections 301a, 301c corresponding thereto (seen in FIG. 3b) after the molding operation. Similarly, a first lower bulge 512 is formed in the first lower groove 511 to match with the lower opening 312a of the first upper hinge arm 310a for forming the lower opening 312a and the shaft hole section 301b corresponding thereto (seen in FIG. 3b). Since the sum of the length of all the openings along the axial direction is equal to the length of the wall along the axis direction in the article, the sum of the length of the two first upper bulges 412 and the first lower bulge 512 would be equal to the axial length Lz of the axial hole 301, or H1+H2+H3=Lz, as shown in FIGS. 10a, 11a. When the upper and lower molds 400, 500 are closed together, two lateral sides of the first lower bulge 512 overlap with the two first upper bulges 412 respectively. The overlapping area A along the axis Lc forms the mold for the shaft hole 301. Thus, the overlapping area A substitutes the cylindrical core pin received between the conventional upper and lower molds.

Figure 2C:
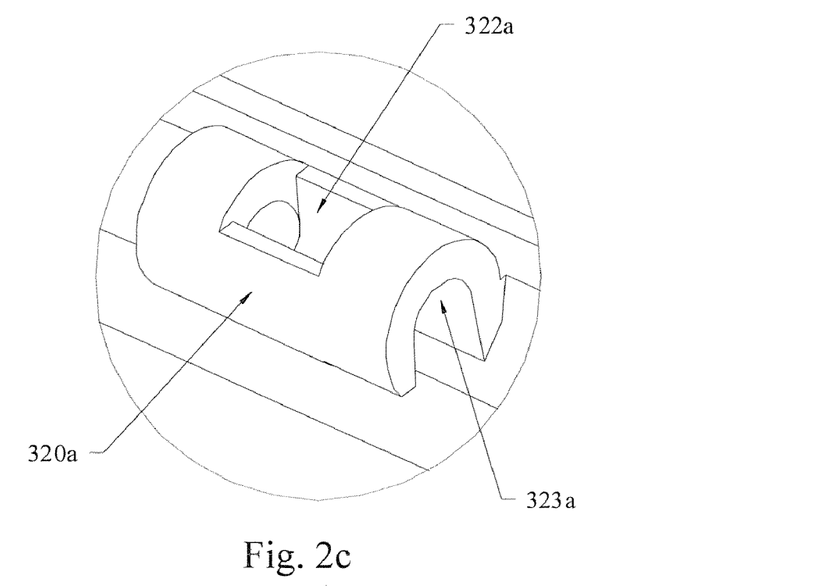
FIG. 2*c* is an enlarged view of Part II disclosed in FIG. 2.
Figure 4A:
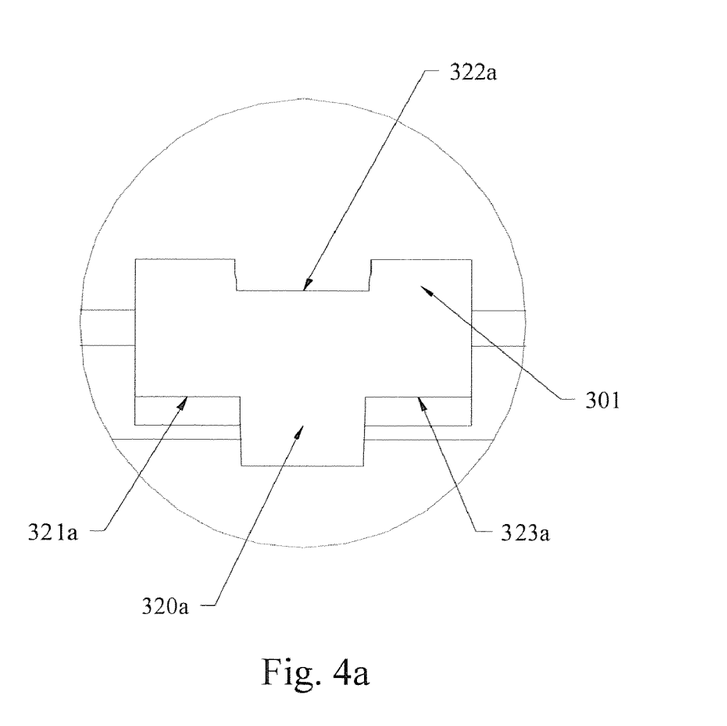
FIG. 4*a* is an enlarged view of Part IV disclosed in FIG. 4.

Similarly, the part corresponding to the first lower hinge arm 320a in the second hinge part 200 of the specialized mold is taken as an example for further describing the structure of the specialized mold for forming the first lower hinge arm 320a. As shown in FIGS. 2c, 4a, two lower openings 321a, 323a and one upper opening 322a are defined in the first lower hinge arm 320a. Referring to FIGS. 10, 10a, 11, 11a, a second upper groove 421 is defined in the second upper chamber 430 and located at the middle of the upper mold 400, and a second lower groove 521 is defined in the second lower chamber 530 and located at the middle of the lower mold 500. The second upper and lower grooves 421, 521 cooperate to define a chamber for forming the first lower hinge arm 320a. Two second upper bulges 422 are formed in the second upper grooves 421 to match with the lower openings 321a, 323a of the first lower hinge arm 320a. The second upper bulges 422 extend into the shaft hole 301 of the first lower hinge arm 320a and terminate at the inner wall facing toward the lower openings 321a, 323a to form the lower openings 321a, 323a and the shaft hole sections corresponding thereto after the molding operation. Similarly, a second lower bulge 522 is formed in the second lower groove 521 to match the upper opening 322a of the first lower hinge arm 320a in order to form the upper opening 322a and the shaft hole section corresponding thereto. The sum of the length of the two second upper bulges 422 and the second lower bulge 522 is equal to the axial length Lz of the shaft hole 301 of the first lower hinge arm 320a. When the upper and lower molds 400, 500 are closed together, two lateral sides of the second lower bulge 522 overlap with the two second upper bulges 422 respectively. The overlapping section along the axis Lc forms the shaft hole 301 of the first lower hinge arm 320a, and substitutes the cylindrical core pin received between the conventional upper and lower dies.

Figure 12:
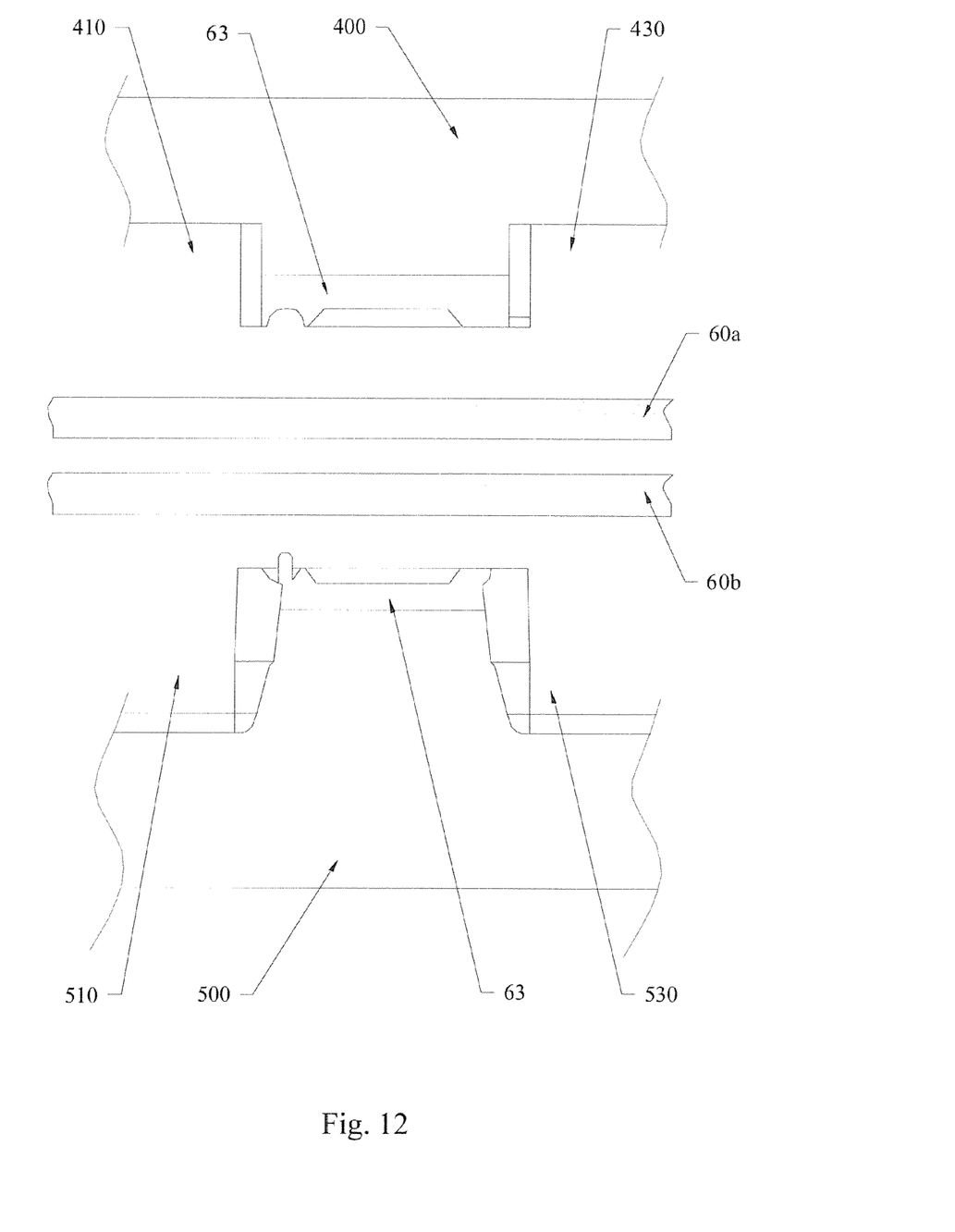
FIG. 12 is a schematic structural diagram of a specialized mold for a blow-molded article prior to mold joining in accordance with the present disclosure.
Figure 13:
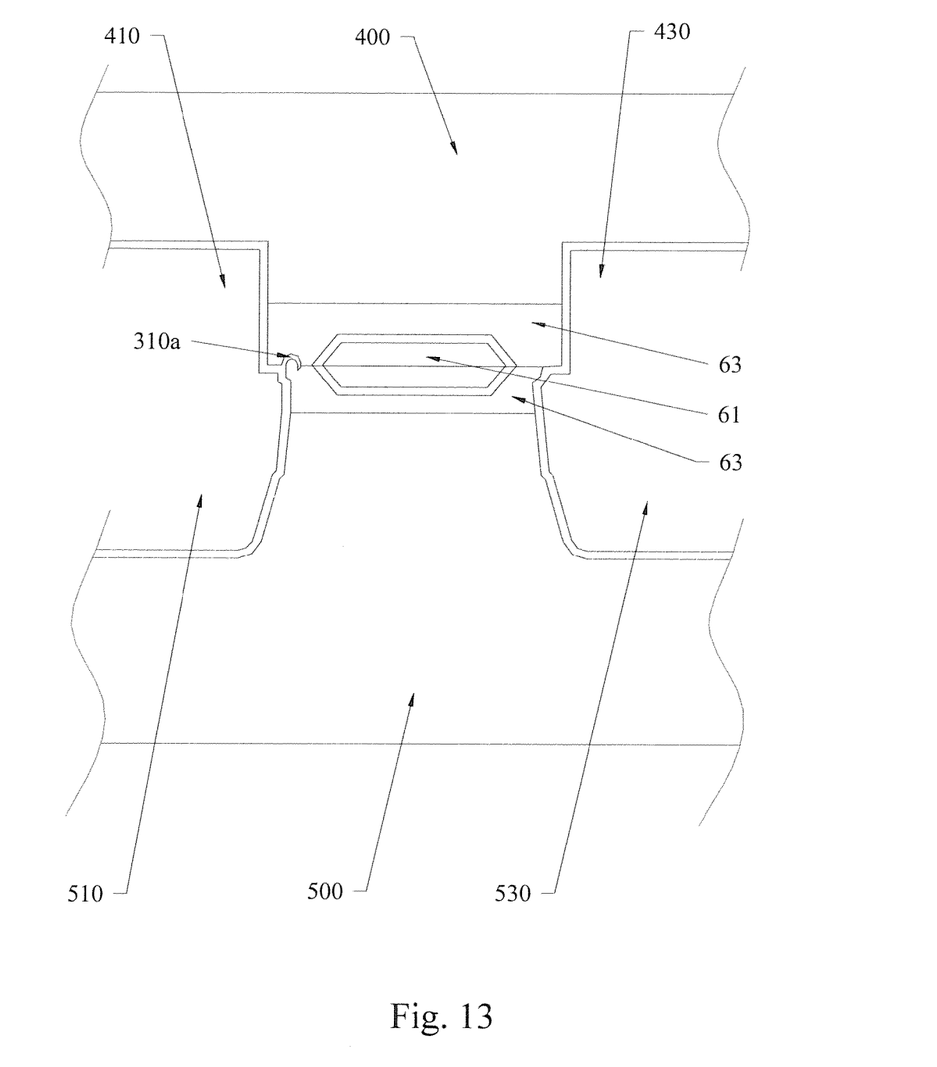
FIG. 13 is a schematic structural diagram of a specialized mold for a blow-molded article upon mold joining in accordance with the present disclosure.

Referring to FIG. 12, in the molding process, two sheets of parison 60a, 60b are placed between the upper and lower molds 400, 500. After the upper and lower molds 400, 500 are closed, and remaining plastic sheet material is discarded and received in the receiving chamber 61. Pressurized air is introduced into the parison, and the parison is deformed to form the contour of the chamber defined by the upper and lower molds 400, 500. Therefore, the first upper hinge arm 310a is formed between the first upper and lower grooves 411, 511 in the first upper and lower chamber 410, 510. At the same time, the first lower hinge arm 320a is formed between the second upper and lower grooves 421,521 in the second upper and lower chamber 430,530 (not shown). After cooling under the pressure for a predetermined time, the molding process is completed and the blow molded article is obtained in the molds.

Other parts of the specialized mold can be provided with reference to the structure of the specialized mold previously described to form other upper and lower hinge arms of the hinge member 300. The shaft holes of the hinge arms are provided without placing a cylindrical core pin between the dies, thus simplifying the molding process and increasing the yield rate of the articles.

Preferably, in the present disclosure of the die construction, the first upper bulges 412 in the first upper chamber 410 and the second upper bulges 422 in the second upper chamber 430 are placed in the middle of the upper mold 400, and the first lower bulge 512 in the first lower chamber 510 and the second lower bulge 522 in the second lower chamber 530 are placed in the middle of the lower mold 500 such that the bulges can act as positioning references for each other during manufacture of the specialized mold to ensure accurate positioning of the bulges. Furthermore, all the bulges in the upper/lower molds forming the same hinge member can preferably be placed in a mold core 63 which is separated from the upper/lower molds. The mold core 63 is placed in the middle of the mold. Since the mold core 63 is changeable, different mold cores 63 can be used to form different hinge members having different numbers of hinge arms, thus satisfying requirements of different articles.

It is believed that the present embodiments and their advantages will be understood based on the foregoing description. It will be apparent that various changes may be made thereto without departing from the spirit and scope of the disclosure. The examples hereinbefore described merely act as preferred or exemplary embodiments of the disclosure.

What is claimed is:

1. A hinge member for a blow molded article, comprising: at least two hinge arms adapted to be affixed to a first portion and a second portion of the article respectively, the two hinge arms comprising an upper hinge arm and a lower hinge arm, each of the at least two hinge arms comprising an axial hole defined therein, a hinge pin extending through the axial holes of the at least two hinge arms; and at least two openings defined in a wall of each of the at least two hinge arms and extending in a direction parallel to a horizontal plane at which the axis of the axial hole is located,
wherein at least one of the at least two openings is positioned in the wall at each side of the horizontal plane, said at least two openings satisfy the following relationship:

$$\sum_{i=1}^{n} L_i \geq L_z \text{ and } d \leq Bi < D (i = 1, 2, \ldots, n;$$

$n$ represents a natural number that is greater than 1);

where,
n stands for a number of openings defined in the wall of the each of the at least two hinge arms;
Li stands for a length of the i-th opening along the axial direction of the axial hole;
Lz stands for a length of the wall of the each of the at least two hinge arms along the axial direction of the axial hole;
Bi stands for a width of the i-th opening projected on the horizontal plane that is perpendicular to the axial direction of the axial hole;
d stands for an inner diameter of the axial hole; and
D stands for an outer diameter of the wall of the each hinge arm.

2. The hinge member as claimed in claim 1, wherein the openings are rectangular in shape.

3. The hinge member as claimed in claim 1, wherein the openings have an elliptic configuration.

4. The hinge member as claimed in claim 1, wherein said at least two hinge arms comprising four hinge arms to form additional two upper hinge arms and two lower hinge arms, wherein all the axial holes of the hinge arms are aligned to form a through hole for the hinge pin to pass through and connect the upper and lower hinge arms together.

5. A blow molded article, comprising:
a first portion;
a second portion; and
at least one hinge member as recited in claim 1, the one hinge member pivotally connecting the first and second hinge portions.

6. A blow-molding mold for forming the blow-molded article as claimed in claim 5, comprising:
an upper mold defining a first upper chamber and a second upper chamber matching outer contours of the first and second hinge portions of the article respectively; and
a lower mold defining a first lower chamber and a second lower chamber matching inner contours of the first and second hinge portions of the article respectively;
wherein a first upper groove is defined in the first upper chamber of the upper mold corresponding to position of the upper hinge arm to match the upper hinge arm, and a first upper bulge is formed in the first upper groove to match an upper opening of the upper hinge arm and the first upper bulge extends into the axial hole of the upper hinge arm and terminates at the wall facing toward the upper opening;

wherein a first lower groove is defined in the first lower chamber of the lower mold corresponding to the position of the upper hinge arm to match the upper hinge arm, and a first lower bulge is formed in the first lower groove to match a lower opening of the upper hinge arm and the first lower bulge extends into the axial hole of the upper hinge arm and terminates at the wall facing toward the lower opening;

wherein a second upper groove is defined in the second upper chamber of the upper mold corresponding to the position of lower hinge arm to match the lower hinge arm, and a second upper bulge is formed in the second lower groove to match an upper opening of the lower hinge arm and the second upper bulge extends into the axial hole of the lower hinge arm and terminates at the wall facing toward the upper opening; and wherein a second lower groove is defined in the second lower chamber of the lower mold corresponding to the position of lower hinge arm to match the lower hinge arm, and a second lower bulge is formed in the second lower groove to match a lower opening of the lower hinge arm and the second lower bulge extends into the axial hole of the: upper hinge arm and terminates at the wall facing toward the lower opening.

7. The blow-molding mold as claimed in claim 6, wherein the first upper bulge of the first upper chamber and the second upper bulge of the second upper chamber are formed at the middle of the upper mold, and wherein the first lower bulge of the first lower chamber and the second lower bulge of the second lower chamber are formed at the middle of the lower mold.

8. The blow-molding mold as claimed in claim 7, further comprising a changeable upper mold core and a changeable lower mold core, wherein the changeable upper mold core is formed at and separate from the middle of the upper mold, the first and second upper bulges being positioned on the upper mold core, and wherein the changeable lower mold core is formed at and separate from the middle of the lower mold, the first and second lower bulges being positioned on the lower mold core.

* * * * *